United States Patent [19]
Fader et al.

[11] 3,792,604
[45] Feb. 19, 1974

[54] SHOCK ABSORBER TESTING APPARATUS

[75] Inventors: John H. Fader; Johan H. Keijzer, both of Hasselt; Willy R. J. Pierle, Hakendover, all of Belgium

[73] Assignee: Monroe Belgium N.V., St. Truiden, Belgium

[22] Filed: Jan. 7, 1972

[21] Appl. No.: 216,308

Related U.S. Application Data

[63] Continuation of Ser. No. 876,546, Nov. 13, 1969, abandoned.

[52] U.S. Cl. .................................................. 73/11
[51] Int. Cl. .......................................... G01m 17/04
[58] Field of Search ....................................... 73/11

[56] References Cited
UNITED STATES PATENTS

| | | | |
|---|---|---|---|
| 1,891,613 | 12/1932 | Widney............................... | 73/11 X |
| 3,164,003 | 1/1965 | MacMillen............................ | 73/11 |
| 2,934,940 | 5/1960 | Beissbarth............................ | 73/11 |
| 2,799,158 | 7/1957 | Federspiel........................... | 73/11 X |
| 3,313,142 | 4/1967 | Lackman ............................ | 73/11 |
| 3,187,554 | 6/1965 | Lackman ............................ | 73/11 |
| 3,383,909 | 5/1968 | Percy................................ | 73/11 |
| 3,456,489 | 7/1969 | Levenson............................. | 73/11 |

*Primary Examiner*—Charles A. Ruehl
*Attorney, Agent, or Firm*—Harness, Dickey & Pierce

[57] ABSTRACT

An apparatus for testing vehicular shock absorbers in situ upon a vehicle having a sprung portion and supporting wheels, the apparatus comprising a support structure, elevating means on the structure engageable with one supporting wheel of a vehicle and adapted to exert an upwardly directed force thereagainst and thereby raise the wheel and that portion of the vehicle supported thereby from a relatively non-elevated position to a relatively elevated position, means for permitting the elevated wheel and portion of the vehicle supported thereon to fall from the elevated position to the non-elevated position, and means for sensing the relative motion between the sprung portion of the vehicle and the vehicle wheel during and after the fall thereof and thereby determine the rebound and compression characteristics of the associated shock absorber.

11 Claims, 5 Drawing Figures

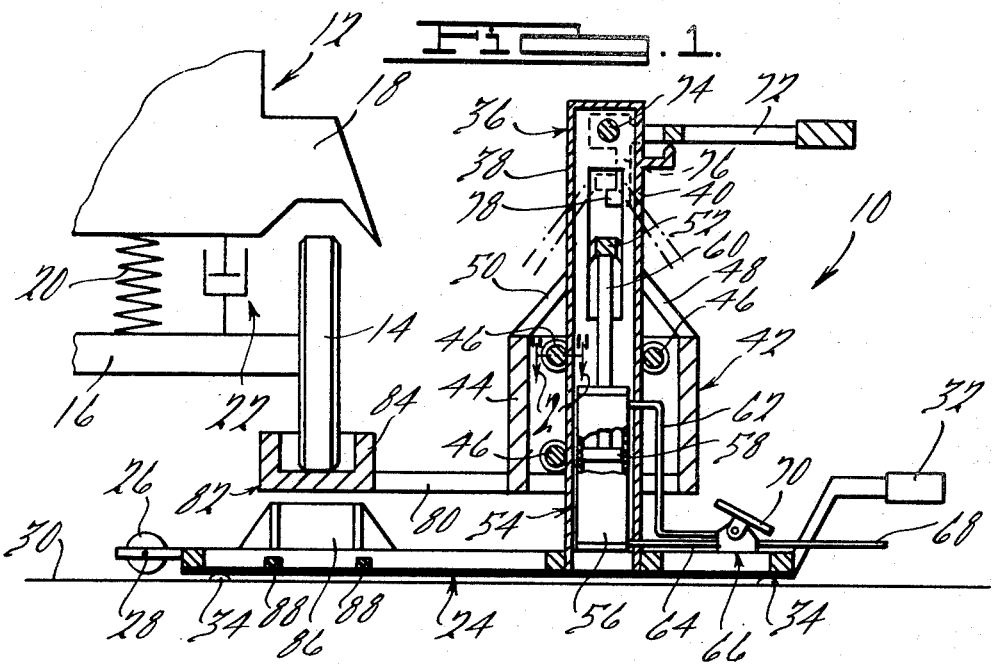
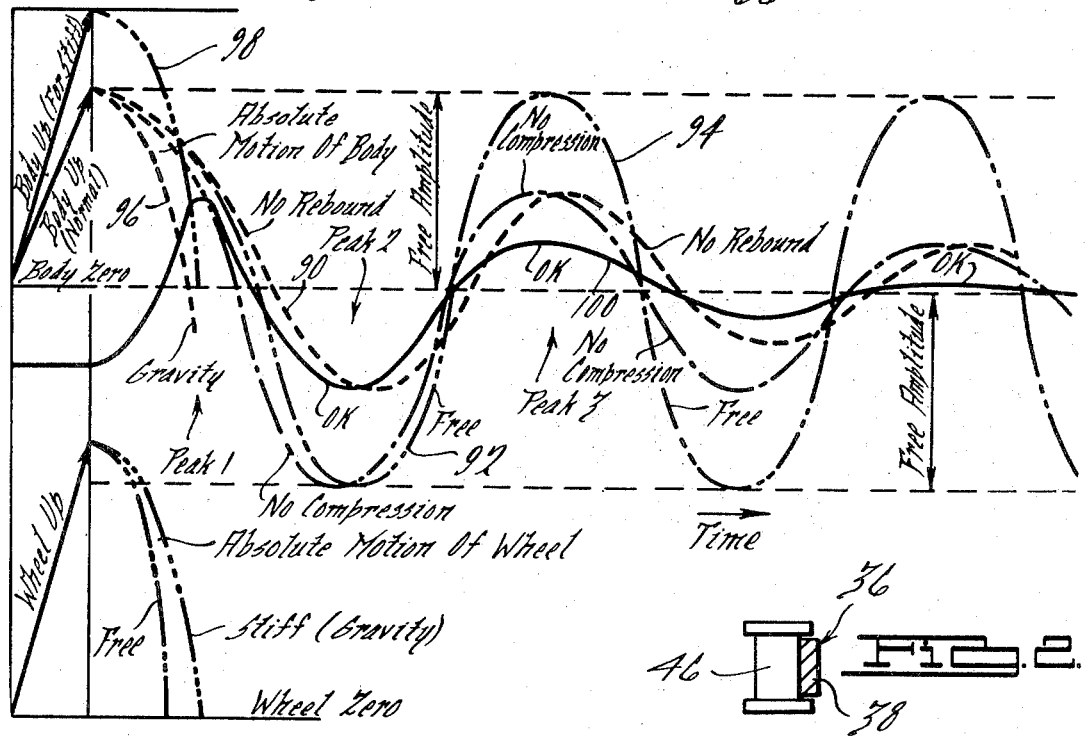
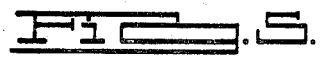

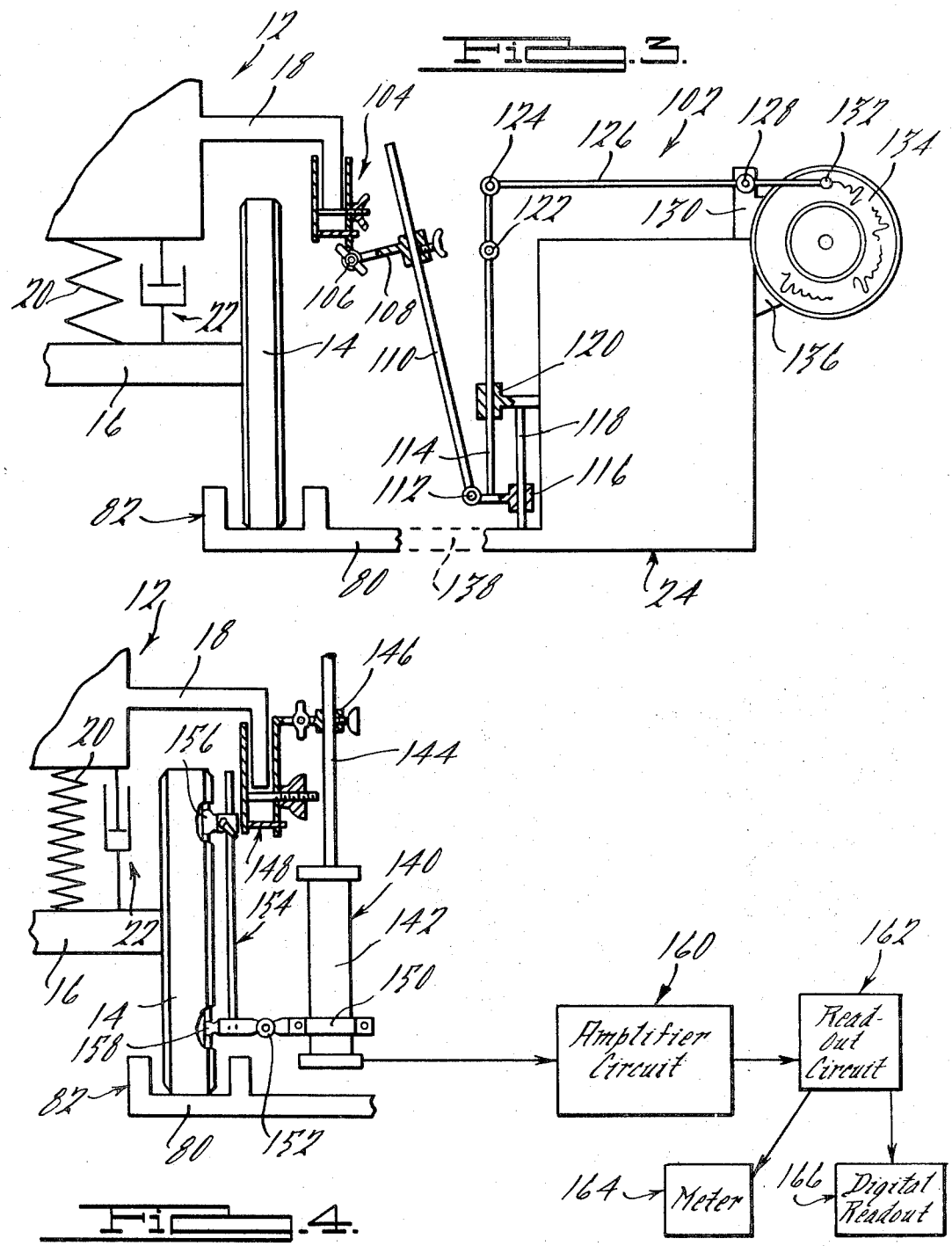

SHOCK ABSORBER TESTING APPARATUS

This is a continuation, of application Ser. No. 876,546, filed Nov. 13, 1969, now abandoned.

BACKGROUND OF THE INVENTION

Generally speaking, the present invention relates to a shock absorber testing apparatus which is adapted to test vehicular shock absorbers in situ upon the associated vehicle, thereby minimizing to the extreme the time and effort required for shock absorber diagnosis. The shock absorber testing apparatus of the present invention generally functions to engage and elevate a vehicle wheel associated with the shock absorber being tested, thereby effecting a compression of the associated suspension spring and elevation of a portion of the vehicle body associated with said wheel. Once the vehicle wheel and body portion have been properly elevated, a release mechanism is actuated which permits the wheel and body portion to fall, with the relative movement between the wheel and body portion being sensed and recorded for subsequent analysis. Through proper evaluation of the recorded depiction or data defining the relative movement between the vehicle wheel and associated body portion, the compression control characteristics of the shock absorber being tested, as well as both the high speed and low speed rebound control characteristics thereof, may be accurately determined, and the testing operator may thereafter use the recorded information to compare the operational characteristics of the shock absorber with pre-recorded "ideal" data obtained from testing similar shock absorbers having known satisfactory characteristics.

SUMMARY OF THE INVENTION

This invention relates generally to improvements in shock absorber testing apparatus and, more particularly, to a new and improved shock absorber testing apparatus which is adapted to determine the rebound and compression control characteristics of shock absorbers while they are in situ upon the associated vehicle.

It is accordingly a general object of the present invention to provide a new and improved shock absorber testing apparatus.

It is a more particular object of the present invention to provide a new and improved shock absorber testing apparatus for testing shock absorbers without removing the same from the associated vehicle.

It is another object of the present invention to provide a shock absorber testing apparatus of the above character which is capable of determining the compression control characteristics of a shock absorber, as well as determining both the high speed and low speed rebound control characteristics thereof.

It is a further object of the present invention to provide a shock absorber testing apparatus of the above character which is of a relatively simple design, is economical to manufacture, is extremely portable, and which may be operatively associated with various types of sensing and recording devices for providing a visual indication of the operational characteristics of shock absorbers being tested thereby.

It is yet another object of the present invention to provide a new and improved shock absorber testing apparatus which determines the compression and rebound control characteristics of a shock absorber by sensing the relative motion between the wheel associated with the shock absorber being tested and the portion of the vehicle supported thereon.

Other objects and advantages of the present invention will become apparent from the following detailed description taken in conjunction with the accompanying drawings.

BRIEF DESCRIPTION OF THE DRAWINGS

FIG. 1 is a side elevational view of an exemplary embodiment of the shock absorber testing apparatus of the present invention, as shown in operative association with a schematic representation of a portion of an automotive vehicle;

FIG. 2 is a cross-sectional view taken substantially along the line 2—2 of FIG. 1;

FIG. 3 is a side elevational view of one embodiment of the means for sensing and recording relative movement between the wheel and vehicle body of a vehicle having a shock absorber being tested in accordance with the present invention;

FIG. 4 is another embodiment of a means for sensing and recording the relative movement between the vehicle and wheel during a shock absorber testing operation in accordance with the present invention, and FIG. 5 is a graphic representation of shock absorber performance characteristics as determined by the testing apparatus of the present invention.

DETAILED DESCRIPTION OF A PREFERRED EMBODIMENT

Referring now in detail to the drawings and in particular to FIG. 1, a shock absorber testing apparatus 10, in accordance with an exemplary embodiment of the present invention, is shown in operative association with an automotive vehicle 12 that is schematically illustrated herein and shown as comprising a vehicle wheel 14 rotatably mounted on one end of a suitable axle 16. The vehicle 12 is also shown as comprising a body or chassis 18 which is operatively connected to and supported on the axle 16 by means of a conventional suspension spring 20 and shock absorber assembly, generally designated 22, the latter of which extends between and is conventionally connected to the vehicle body 18 and axle 16 and the operational characteristics of which are to be ascertained by means of the testing apparatus of the present invention, as will hereinafter be described in detail.

The shock absorber testing apparatus 10 of the present invention generally comprises an elongated, generally flat or planar support structure 24 which is provided at one end thereof with a pair of rollers or castors 26 rotatably mounted on a suitable axle member 28 that is spaced sufficiently above a ground support surface, designated by the reference numeral 30, such that when the structure 24 is disposed in the operative horizontal attitude shown in FIG. 1, the castors 26 are spaced upwardly from and are therefore disengaged from the surface 30. The end of the support structure 24 opposite the castors 26 is provided with a suitable manually engageable handle or the like 32 which is adapted to be gripped by the operator for tilting the end of the structure 24 adjacent the handle 32 upwardly, resulting in the castors 26 engaging the surface 30 to permit the operator to transport or "wheel" the apparatus 10, for example, between a storage location and the location where a shock absorber testing operation is to be performed. Suitable downwardly extending support pads or feet, generally designated 34, are provided on the underside of the support structure 24 and serve as a bearing or support means for the structure 24 when the same is disposed in the operative position shown in FIG. 1.

Extending generally perpendicularly upwardly from the support structure 24 is a support column 36 which is fixedly secured at its lower end to the support structure 24 and is preferably in the form of a generally square or rectangular hollow tubular metallic member defining opposed, spaced parallel side walls 38 and 40, as illustrated. The support column 36 is adapted to operatively support an elevatable carriage assembly, generally designated 42, which comprises a suitable housing or enclosure 44 that is disposed in substantially surrounding relationship with respect to the column 36 and is provided in the interior thereof with a plurality of guide rollers, generally designated 46, which are adapted to peripherally engage the side walls 38 and 40 of the column 36 and thereby support the carriage assembly 42 for vertical adjustable movement upwardly and downwardly along the column 36, as will be apparent. Extending upwardly from the enclosure 44 is a pair of converging support yoke members 48 and 50 which extend through suitable openings (not shown) in the side walls 38, 40 and intersect interiorly of the support column 36 at an intermediate support section, generally designated by the numeral 52.

Means for raising and lowering the carriage assembly 42, and hence the wheel 14 and portion of the vehicle body 18 supported thereon, is provided by a piston and cylinder assembly, generally designated 54, which may be either hydraulically or pneumatically actuated and comprises a cylinder 56 within which a piston member 58 is reciprocally mounted, the piston member 58 being connected to the lower end of a suitable vertically disposed piston rod 60 which is engageable at its upper end with the intermediate support section 52, whereby to operatively connect the piston and cylinder assembly 54 with the carriage assembly 42. The cylinder 56 is operatively connected by means of suitable fluid conduits 62 and 64 with a suitable food pedal operated control valve 66 which is in turn communicable with a suitable source of pressurized fluid via a conduit 68. As will be apparent to those skilled in the art, suitable actuation of the valve 66 by the operator properly depressing a foot actuatable pedal 70 will effect raising and lowering of the piston member 58 in the cylinder 56 and hence effect raising and lowering of the carriage assembly 42.

The shock absorber testing apparatus 10 of the present invention is provided with means for releasably supporting the carriage assembly 42 in an elevated position, as indicated by the phantom lines in FIG. 1, which means is actuatable to release the assembly 42 to permit the same to fall under the influence of gravity to a relatively lowered position during a shock absorber testing operation. Such means is provided by a manually actuatable release arm or handle 72 which is pivotably mounted at the upper end of the column 36 by means of a suitable pivot pin or shaft 74. The arm 72 is provided with a downwardly extending latch mechanism 76 having an outwardly projecting release tang 78 that is adapted to engage the underside of the support section 52 when the assembly 42 is in its elevated position, thereby supporting the assembly 42 in said position. At such time as it is desired to release the assembly 42, the outer end of the arm 72 is raised or pivoted in a counterclockwise direction in FIG. 1, whereby the tang 78 will be disengaged from the section 52 of the assembly 42, whereby to permit the assembly 42 to drop or fall downwardly.

The apparatus 10 is provided with an outwardly extending, generally horizontally disposed arm or beam member 80 which is fixedly secured at one end to the assembly 42 and is provided at the opposite end thereof with an elevating platform 82. The platform 82 is provided with upwardly projecting tire or wheel confining side wall portions 84 and is adapted to operatively support a vehicle wheel, such as the wheel 14, for movement thereof to and from an elevated position upon elevation and releasing of the carriage assembly 42 along the column 36. The support structure 24 is preferably provided with a suitable ramp means 86 which is inclined toward the elevating platform 82, whereby to permit the vehicle 12 to be driven directly to a position wherein the particular wheel thereof associated with the shock absorber to the tested may be driven directly onto the platform 82 preparatory to the testing operation and subsequently driven off therefrom upon completion of the testing operation. It will be noted that the support structure 24 is also provided with suitable resilient bumper elements 88 directly subjacent the platform 82 which are adapted to serve as a cushioning means for the elevating platform 82 and portion of the vehicle body 18 and wheel 14 supported thereon upon the fall thereof from their respective elevated positions during a shock absorber testing operation.

Generally speaking, the operational characteristics, and in particular, the compression and rebound control characteristics of the shock absorbers being tested by the apparatus 10 are ascertained by sensing and recording the relative movement between the vehicle wheel 14 and body 18 upon release and fall thereof from the elevated position to which the wheel 14 and body 18 are elevated by means of the carriage assembly 42. More particularly, it will be seen that when the platform 82 is raised, due to energization of the piston and cylinder assembly 54, the suspension spring 20 associated with the shock absorber 22 being tested will be compressed to a somewhat greater extent than in its normal or lowered position supporting the vehicle body 18 on the axle 16. This is due to the fact that in an elevated position, the wheel 14 carries a somewhat greater load than it does when resting on the ground. When the platform 82 is released due to actuation of the handle or arm 72, the wheel 14 and body 18 will fall downwardly together with the platform 82 and assembly 42; however, the suspension spring 20 will act to force or eject the wheel 14 downwardly away from the body 18, which motion of the wheel 14 is resisted by the shock absorber 22 and more particularly, is resisted by the rebound control capability or effectiveness of the shock absorber 22. Once the wheel 14 has dropped downwardly to the furtherest extent possible, i.e., when the platform 82 engages the bumpers 88, the shock absorber 22 undergoes a compression stroke due to the fact that the body 18 of the vehicle 12 is still falling, after which time the vehicle body will be biased upwardly due to the action of the spring 20 which will be compressed again as the body 18 moves downwardly toward the vehicle wheel 14, thereby causing the shock absorber 22 to undergo a subsequent rebound cycle. It has been discovered that the above described relative motion between the vehicle wheel and body may be studied and analyzed in order to determine the rebound and compression control characteristics of the shock absorber being tested, with these characteristics being compared with the characteristics of a known satisfactory shock absorber so that the testing operator can determine whether or not the rebound and compression control or effectiveness of the shock absorber being tested come within certain predetermined limits within which a satisfactory shock absorber should operate.

FIG. 5 is a graphic illustration of the relative motion of the vehicle wheel 14 and body 18 with respect to time during a shock absorber testing operation and illustrates how the relative motion therebetween is in the form of a series of peaks, the amplitude of which may be compared with the peaks of the relative motion between a vehicle wheel and body of a vehicle provided with a shock absorber of known quality and characteristics. In particular, it will be seen that as the wheel 14 is ejected away from the body 18 by the action of the spring 20 during the initial falling of the platform 82, a first peak, which is positive, is formed which depends primarily upon the damping characteristics of the shock absorber, principally upon the rebound control thereof, in particular, the high speed rebound control, since the actual force on the wheel 14 is greater than the gravitational force on the body 18 due to the action of the spring 20. With reference to FIG. 5, the curve indicated by the dotted line 90 indicates the relative movement between the wheel 14 and body 18 when the high speed rebound characteristics of the shock absorber 22 are poor. It will be seen that at the location of peak number 1, shown graphically in FIG. 5, a shock absorber with poor or no rebound control will have a relatively large peak, (large amplitude) while a shock absorber with good rebound control will have a substantially smaller peak (small amplitude). Thus, the value of the peak is determined by the rebound control and hence the amplitude of the curve at peak number 1 provides an accurate measure of the high speed rebound control of the shock absorber 22.

The second peak produced during a testing operation, or peak number 2 shown graphically in FIG. 5 is negative, and although being influenced somewhat by the rebound control of the shock absorber 22, the second peak principally depends upon the compression characteristics thereof. As previously stated, peak number 2 occurs when the platform 82 engages the bumpers 88 while the body 18 continues to fall. If the shock absorber 22 has relatively poor compression control characteristics, the peak number 2 will be relatively greater (in a egative sense) as indicated by the curve 92 in FIG. 5; however, if the shock absorber has good compression control, the amplitude at peak number 2 will be substantially smaller.

The third peak occurring during a testing operation, i.e., peak number 3 in FIG. 5, which is positive in direction, depends upon the low speed rebound control of the shock absorber 22, although it is influenced at least to some extent by the high speed rebound control and compression control. The third peak occurs as the body 18 moves upwardly or away from the wheel 14 due to the upward directed force exerted thereagainst by the spring 20 which is compressed as the body 18 moves downward after the platform 82 comes to rest on the bumpers 88. As again indicated by the curve 90 in FIG. 5, the low speed rebound control of the shock absorber being tested, if poor, will have a relatively large amplitude at peak number 3, and will have a somewhat smaller amplitude if the low speed rebound control of the shock absorber is satisfactory.

By way of comparison, the dotted curve indicated by the numeral 94 in FIG. 5 illustrates the relationship of the relative movement between the body 18 and wheel 14 in the absence of the shock absorber 22, or when said shock absorber has vitually no damping effect upon relative movement therebetween. It will be seen that the wheel 14 will be ejected downwardly relative to the body, thereby moving with an acceleration even greater than gravity (see the curve 96) and reaches the ground faster than if it were free falling. The vehicle body 18, on the other hand, will fall with increasing acceleration from zero to the maximum acceleration, due to the easing of the spring force as the body 18 moves downwardly toward the wheel 14. The body 18 will then oscillate with substantially constant amplitude and at the natural frequency of the spring 20. The relative movement between the wheel 14 and body 18 when a relatively stiff shock absorber, i.e., infinite damping, is utilized is depicted by the dotted line designated by the numeral 98 and illustrates that when the platform 82 is released, both the wheel 14 and body will fall with the acceleration of gravity since both of these members are like a single body due to the stiff characteristics of the shock absorber 22 which will prevent the suspension spring 20 from ejecting the wheel 14 away from the body 18.

It will be seen that when the shock absorber 22 has relatively poor rebound control, the relative movement between the body 18 and wheel 14 is such that the wheel 14 will fall in the same manner as when the wheel is free, i.e., when the shock absorber 22 has relatively poor damping control, but that the body 18 will fall and pass the zero point somewhat later than the free condition indicated by the curve 92 since after the wheel 14 reaches its lowest position, there is a compression control stroke in the shock absorber 22, i.e., as indicated at peak number 2, which gives a decrease in the frequency of oscillation of the body 18. When the compression control of the shock absorber 22 is poor, the downward movement of the wheel 14, upon release of the platform 82, will be somewhere between the stiff and free shock absorber conditions, depending upon the rebound control thereof. The solid curved line designated by the numeral 100 indicates the relative movement between the wheel 14 and body 18 for a shock absorber having satisfactory rebound and compression control characteristics and constitutes what could be called the ideal curve against which the actual wheel-body movement relation can be compared to determine the quality of the shock absorber being tested. It will be seen that the amplitude of the curve 100 is substantially smaller at each of the peaks 1, 2 and 3 relative to the curves 90 and 92 indicating poor rebound and compression control, respectively.

In order for the operator of the shock absorber testing apparatus 10 of the present invention to determine the rebound and compression control characteristics of the shock absorber 22 being tested, the apparatus 10 is preferably provided with means for providing a visual indication of the amplitude or magnitude of the peaks depicted by the relative movement of the wheel 14 with respect to the body 18 upon releasing the carriage assembly 42 and platform 82 carried thereby. This visual indication may be in the form of a graph such as is indicated in FIG. 5, or alternatively, may be in the form of an electrical signal, as will hereinafter be described. The graph or signal may then be compared by the operator with a set of ideal curves, graphs, or signals which may be properly catalogued in accordance with the size and type of shock absorbers being analyzed. While a wide variety of different types of devices may be used for sensing and recording the relative movement between the wheel 14 and body 18 during a shock absorber testing operation, two preferred devices are shown and described herein in FIGS. 3 and 4, with the device shown in FIG. 3 being adapted to provide a graphic indication of the relative movement between the wheel and body, similar to the graphic depictions shown in FIG. 5, and the device shown in FIG. 4 being adapted to provide an electrical signal proportional to the magnitude or amplitude of the peaks produced during a testing operation, as will hereinafter be described in detail.

Referring now to FIG. 3, it will be seen that the support structure 24 is provided with a sensing and recording device, generally designated 102, which consists of a clamping fixture 104 adapted to be detachably connected to the vehicle body 18, for example, to the vehicle fender or the like. The fixture 104 is adapted to be pivotably connected by means of a suitable hinge mechanism 106 to an adjustable bracket 108 that is slidable along and adjustably secured to an upwardly inclined rod or shaft 110 which is in turn connected via a suitable pivotal connection 112 to the lower end of a vertically reciprocable shaft or rod 114. The lower end of the rod 114 and connection 112 are guided for vertical reciprocal movement by means of a suitable guide arrangement consisting of a sleeve element 116 vertically slidable along a guide member 118, with the rod 114 being guided for reciprocal movement within a suitable sleeve member 120. The upper end of the rod 114 is operatively connected by suitable pivotal or hinge connections 122 and 124 with a generally horizontally disposed member 126 which is hingedly or pivotably connected at 128 to a support bracket 130. The outer end of the member 126 is adapted to operatively carry or support a suitable recording pen or the like 132 which is adapted to depict relative movement of the member 126 on a suitable recording disc or dial 134 which is adapted to be rotated at a preselected rate by means of a suitable electrical motor or the like 136 for the purpose of introducing a time factor to the graphic representation. It will be noted that the dial 134 is connected by any suitable structural means indicated at 138 to the platform 82 which assures that a predetermined dimensional relationship will be maintained between the fixture 104 and platform 82. In operation, upon release of the platform 82, the wheel 14 and portion of the vehicle body 18 supported thereon will fall in the manner hereinabove described, resulting in downward movement of the platform 82 and fixture 104. Such movement of the fixture 104 will effect simultaneous movement of the rods 110 and 114 which will in turn effect pivotal movement of the member 126, with movement of the member 126 being recorded on the dial 134 by means of the recording pen 132. This results in a graphic illustration being placed on the dial 134 of the relative displacement of the vehicle body 18 and wheel 14 verses time, which graphic illustration will be comparable to the graphic illustration of FIG. 5 and therefore may be used in determining the rebound and compression control characteristics of the shock absorber 22.

Referring now to FIG. 4, a device for producing an electrical signal in response to the relative movement between the wheel 14 and body 18 during a shock absorber testing operation is shown as comprising a rectilinear transducer mechanism, such as a potentiometer, generally designated 140, having a body 142 and a relatively movable spindle or armature 144 which is connected via a suitable adjustable bracket 146 and clamping fixture 148 to the body portion of the vehicle 12. The body 142 is adapted to be connected by means of a suitable mounting bracket 150 and pivotable connection 152 to a clamping mechanism 154 having a pair of pinion elements 156 and 158 which are engageable with the rim of the wheel 14 and are properly adjustable so as to adapt the mechanism 154 to different size wheel rims, as will be apparent. The potentiometer 140 is adapted to be communicable with a suitable electrical amplifier circuit 160 which receives electrical signals from the potentiometer 140 that are proportional to the relative movement between the vehicle body 18 and wheel 14 and which properly transforms said signals to a form where they may be communicated to an associated readout circuit 162 that may be associated with a visual readout meter 164 and/or a digital readout mechanism 166, either of which will provide a visual indication of the magnitude or amplitude of the peaks occurring during a shock absorber testing operation. The details of the electrical circuitry involved in producing the aforesaid electrical signals will be evident to those skilled in the art and therefore have been omitted herein for purposes of simplifying the instant disclosure.

In operation of the shock absorber testing apparatus 10 of the present invention, the valve 66 is properly actuated such that the carriage assembly 42 is in its lowered position, whereby the vehicle having the shock absorber to be tested may be positioned such that the wheel associated with the shock absorber is driven up the ramp 86 onto the platform 82. Thereafter, the pedal 70 is properly actuated to effect energization of the piston and cylinder assembly 54, whereby the carriage assembly 42 is biased upwardly from the solid line position to the dotted line position in FIG. 1. As hereinabove described, such upward movement of the assembly 42 will effect concomitant upward movement of the platform 82, thereby elevating the vehicle wheel carried thereon and portion of the vehicle body supported on said wheel. At such time as the carriage assembly 42 is properly elevated, the handle 72 is moved to a position wherein the tang 78 is engaged with the lower side of the support section 52, thereby positively maintaining the carriage assembly 42, platform 82 and vehicle wheel and wheel body in an elevated attitude. Thereafter, the piston and cylinder assembly 54 may be deenergized by proper actuation of the valve 66, whereby to retract the piston rod 60 to permit unobstructed free fall of the assembly 42.

At such time as it is desired to perform the actual testing operation, the handle 72 is biased in a counterclockwise direction in FIG. 1, thereby disengaging the tang 78 with the support section 52, resulting in the fall of the carriage assembly 42, platform 82 and vehicle wheel and wheel body supported thereon. During such falling of the vehicle wheel and wheel body and subsequent thereto when the vehicle body is biased upwardly due to the action of the suspension spring associated with the shock absorber being tested, the relative movement between the wheel and vehicle body may be sensed and recorded by any suitable means, such as by either of the devices shown in FIGS. 3 and 4. The recording thus obtained may then be compared with the performance characteristics of shock absorbers which are known to have satisfactory rebound and compression control characteristics in the manner hereinabove described, whereby the operator may ascertain whether or not the shock absorber being tested has satisfactory operational characteristics or should be repaired or replaced. Upon completion of the testing operation, the vehicle may be driven off from the platform 82 via the ramp 86 preparatory to the next successive shock absorber testing operation.

While it will be apparent that the preferred embodiment illustrated herein is well calculated to fulfill the objects above stated, it will be appreciated that the present invention is susceptible to modification, variation and change without departing from the scope of the invention.

We claim:

1. In an apparatus for testing a shock absorber in situ upon a braked, parked or otherwise relatively stationary vehicle having road contacting wheels and associated vehicle suspension springs, a support structure including a generally flat section adapted to be located at least partially beneath one of the road contacting wheels, an elevatable platform supported by said structure for upward and downward movement relative to said structure and including a surface located along one marginal edge disposed beneath and at least partially supporting one road contacting wheel of said vehicle, actuating means operatively connected between said platform and said support structure for elevating said platform to support said wheel and that portion of the vehicle supported thereon from a non-elevated to an elevated position relative to said structure and simultaneously compressing the suspension spring associated with said wheel, means for selectively dropping said platform to said nonelevated position and for permitting said elevated wheel and portion of the vehicle supported thereon to fall from said elevated position to said nonelevated position whereby said wheel will be ejected downwardly under the influence of the compressed spring, and means for sensing and recording the relative motion between said elevated vehicle wheel and the portion of the vehicle supported by said compressed suspension spring during downward movement thereof for determining the operational characteristics of the associated shock absorber.

2. An apparatus as set forth in claim 1 wherein said means for sensing the relative motion between said vehicle wheel and said portion of the vehicle supported by said compressed suspension spring comprises a mechanical recording mechanism.

3. An apparatus as set forth in claim 1 which includes means for introducing a time factor into the recording of the relative motion between said vehicle wheel and said portion of the vehicle supported by said compressed suspension spring during and after the fall thereof.

4. An apparatus as set forth in claim 3 wherein said means for introducing a time factor comprises a rotatable dial and power means for selectively rotating said dial.

5. An apparatus as set forth in claim 1 wherein said actuating means comprises jack means for elevating said platform.

6. An apparatus as set forth in claim 1 wherein said actuating means comprises piston and cylinder means.

7. An apparatus as set forth in claim 1 wherein said support structure is portable and may therefore be easily transported.

8. An apparatus as set forth in claim 1 which includes means for introducing a time factor into the recording of the relative motion between the vehicle wheel and said portion of the vehicle supported by said compressed spring after the fall thereof, said means for introducing a time factor comprising a rotatable dial and power means for selectively rotating said dial, wherein said actuating means comprises jack means for elevating said platform, wherein said jack means comprises piston and cylinder means, and wherein said support structure is portable and may therefore be easily transported.

9. An apparatus as set forth in claim 1 wherein said sensing means includes transducer means for providing an output signal proportional to the relative movement between said vehicle wheel and said portion of the vehicle supported by said compressed suspension spring.

10. An apparatus as set forth in claim 9 wherein a first portion of said transducer means is connectible to the vehicle wheel and a second portion of said transducer means is connectible to the portion of the vehicle supported on said wheel.

11. An apparatus as set forth in claim 9 which includes electrical circuit means for producing the electric signal representative of the relative motion between the vehicle wheel and the portion of the vehicle supported thereon upon fall thereof.

* * * * *